(12) United States Patent
Ambühl et al.

(10) Patent No.: US 11,698,614 B2
(45) Date of Patent: Jul. 11, 2023

(54) SYSTEMS, DEVICE AND METHOD OF MANAGING A BUILDING AUTOMATION ENVIRONMENT

(71) Applicant: Siemens Schweiz AG, Zürich (CH)

(72) Inventors: Stefan Ambühl, Meilen (CH); Sandeep Mahale, Maharashtra (IN); Padmshil Pardikar, Pune (IN)

(73) Assignee: SIEMENS SCHWEIZ AG, Zurich (CH)

( * ) Notice: Subject to any disclaimer, the term of this patent is extended or adjusted under 35 U.S.C. 154(b) by 322 days.

(21) Appl. No.: 16/888,111

(22) Filed: May 29, 2020

(65) Prior Publication Data

US 2020/0379425 A1 Dec. 3, 2020

(30) Foreign Application Priority Data

May 31, 2019 (EP) .................................... 19177657

(51) Int. Cl.
*G05B 19/042* (2006.01)
*H04W 4/029* (2018.01)
(Continued)

(52) U.S. Cl.
CPC ......... *G05B 19/0425* (2013.01); *G06F 1/163* (2013.01); *G06V 40/20* (2022.01); *H04W 4/029* (2018.02)

(58) Field of Classification Search
CPC ...... H04W 4/029; H04W 4/33; G01C 21/206; G01C 21/38; H04L 67/52; H04L 67/01; H04L 67/12; H04L 67/141; H04M 2242/30; H04M 3/42348; H04M 2242/15; G05B 19/0425; G06F 1/163; G06F 3/017;
(Continued)

(56) References Cited

U.S. PATENT DOCUMENTS

2009/0065578 A1   3/2009   Peterson ............... 235/382
2011/0115816 A1   5/2011   Brackney ............... 345/629
(Continued)

FOREIGN PATENT DOCUMENTS

CN   104049587   9/2014   ........... G05B 19/418
GB   2513457   10/2014   ........... G05B 19/418

OTHER PUBLICATIONS

Search Report for EP Application No. 19177657.4, 10 pages, dated Sep. 11, 2019.

*Primary Examiner* — Quoc Thai N Vu
(74) *Attorney, Agent, or Firm* — Slayden Grubert Beard PLLC

(57) ABSTRACT

Various embodiments include a method of managing a building automation environment comprising: determining coordinates of a wearable device and an associated wearer in the building automation environment; rendering a representative view of a portion of the building automation environment based on the determined coordinates and an environment map associated with the building automation environment, wherein the representative view includes a multi-dimensional view of the portion of the building automation environment and wherein the portion includes one or more devices in the building automation environment; and modifying operation parameters of the portion of the building automation environment through one of gesture-based and voice-based input.

9 Claims, 6 Drawing Sheets

(51) Int. Cl.
*G06F 1/16* (2006.01)
*G06V 40/20* (2022.01)

(58) Field of Classification Search
CPC .......... G06F 3/16; G06V 40/20; G06Q 10/04; G06Q 10/06; G06Q 10/08; G06Q 50/06
See application file for complete search history.

(56) References Cited

U.S. PATENT DOCUMENTS

| | | | | |
|---|---|---|---|---|
| 2013/0169681 | A1* | 7/2013 | Rasane | G06T 19/003 345/633 |
| 2014/0282257 | A1* | 9/2014 | Nixon | G06F 3/048 715/835 |
| 2016/0330285 | A1* | 11/2016 | Brophy | F24F 11/57 |
| 2018/0218540 | A1* | 8/2018 | Sridharan | H04N 7/181 |

* cited by examiner

SYSTEMS, DEVICE AND METHOD OF MANAGING A BUILDING AUTOMATION ENVIRONMENT

CROSS-REFERENCE TO RELATED APPLICATIONS

This application claims priority to EP Application No. 19177657.4 filed May 31, 2019, the contents of which are hereby incorporated by reference in their entirety.

TECHNICAL FIELD

The present disclosure relates to building automation. Various embodiments may include systems, devices, and/or methods for managing a building automation environment.

BACKGROUND

Building automation management is management of automation devices in a building automation environment. The building automation management is typically achieved using a management station or a local operating device. The management station interacts with devices in the building to provide a user with parameters associated with the devices. Further, the management station enables the user to modify the parameters of the devices.

For example, the user is interested in understanding the ambient temperature for a room. In the absence of a local display, the user uses the management station to find out the ambient temperature in real-time. To determine the ambient temperature of the room the user may need to be able to identify the room and/or the temperature sensor by its associated reference in the management station. Accordingly, the user may employ graphical or hierarchical based navigation to locate the temperature sensor on the management station. In certain cases, the user may need to check the building plan and the electrical schema for the devices to make sure the correct value is extracted.

The available methodology of using a management station to manage the building automation environment may pose restrictions on the user to identify the devices in the environment. Therefore, the user may not be able to effectively control the devices in real-time. These challenges increase in scenarios where the devices are not directly visible to the user.

SUMMARY

The present disclosure describes systems, devices, and/or methods to effectively manage a building automation environment. For example, some embodiments include a method of managing a building automation environment (350, 450), the method comprising: determining coordinates of a wearable device (160, 310) and associated wearer in the building automation environment (350, 450); rendering a representative view (520) of at least one portion of the building automation environment (350, 450), based on the coordinates of the wearable device (160, 310) and an environment map associated with the building automation environment (350, 450), wherein the representative view (520) includes a multi-dimensional view of the at least one portion of the building automation environment (350, 450) and wherein the at least one portion includes one or more devices (412) in the building automation environment (350, 450); and modifying operation parameters of the at least one portion of the building automation environment (350, 450) through one of gesture-based and voice-based inputs.

Some embodiments include establishing a communication channel between the wearable device (160, 310) and the building automation environment (350, 450) via a building automation server operable on a cloud computing platform; and receiving on the wearable device (160, 310) the environment map.

Some embodiments include generating the environmental map including geometric coordinates of the devices (412) from building model data, the building model data comprising a dataset pursuant to one or more Building Information Modelling Standards.

In some embodiments, determining coordinates of the wearable device (160, 310) and associated wearer in the building automation environment (350, 450), further comprises: mapping relative coordinates of the wearable device (160, 310) to predetermined coordinates of the building automation environment (350, 450); and validating the mapping of the relative coordinates of the wearable device (160, 310) based on a scannable input to the wearable device (160, 310), wherein the scannable input is provided at a predetermined location in the building automation environment (350, 450).

Some embodiments include detecting the devices (412) in the at least one portion of the building automation environment (350, 450) based on the environment map, wherein the devices (412) include devices not directly visible to occupants/the wearer in the at least one portion of the building automation environment (350, 450); and rendering a suggestive direction (420) indicating the location of the devices (412).

Some embodiments include determining a view vector (410) for the devices (412) with respect to the coordinates of the wearable device (160, 310); and mapping the coordinates of the wearable device (160, 310) to the geometric coordinates in the environment map associated with the devices (412).

In some embodiments, rendering a representative view (520) of the at least one portion of the building automation environment (350, 450) comprises: retrieving the operation parameters associated with the devices (412) in the at least one portion of the building automation environment (350, 450); validating that the retrieved operation parameters are associated with the devices (412); and rendering the representative view (520) including the operation parameters of the devices (412) in the at least one portion of the building automation environment (350, 450).

In some embodiments, retrieving the operation parameters associated with the devices (412) in the at least one portion of the building automation environment (350, 450) comprises: establishing the communication channel using building communication protocol between the devices (412) in the building automation environment (350, 450), wherein the building communication protocol include at least one of Building Automation and Control network (BACnet), Modbus, Local Operating Network (Lonwork) and Digital Addressable Lighting Interface (DALI) protocol.

Some embodiments include rendering the representative view (520) of the at least one portion in an X-ray mode, whereby the operation parameters of components of the devices (412) are rendered.

Some embodiments include determining an optimal route from the coordinates of the wearable device (160, 310) to a predetermined portion of the building automation environment (350, 450); and guiding the wearer to the predetermined portion of the building automation environment (350, 450) by rendering suggestive directions indicating the optimal route.

As another example, some embodiments include a wearable device (160, 310) for managing a building automation environment (350, 450) comprising: a processing unit (162); and a memory unit (168) coupled to the processing unit, wherein the memory unit comprises an augmented awareness-based management module (170) configured for performing the methods described above.

In some embodiments, there is a communication unit (164) operable to communicate with a remote server (110); wherein the processing unit is coupled to the communication unit.

As another example, some embodiments include a system (100) managing a building automation environment (350, 450), the system comprising: one or more processing units (102); and one or more memory units (115) coupled to the one or more processing units, wherein the one or more memory units comprises an augmented awareness-based management module (112) configured for performing the methods described above.

As another example, some embodiments include a system (100) comprising: one or more servers (110) remotely located from a building automation environment (350, 450); one or more sensors communicatively coupled to the one or more servers; and one or more wearable devices (160, 310) communicatively coupled to the one or more servers, wherein the one or more servers comprise computer readable instructions, which when executed by the one or more servers cause the one or more servers to perform the methods described above.

In some embodiments, the one or more wearable devices (160, 310) are communicatively coupled to each other.

As another example, some embodiments include a computer program product comprising machine readable instructions, that when executed by a processing unit, cause the processing unit to perform a method as described above.

BRIEF DESCRIPTION OF THE DRAWINGS

The teachings of the present disclosure are further described hereinafter with reference to illustrated embodiments shown in the accompanying drawings, in which.

DETAILED DESCRIPTION

Figure 1:
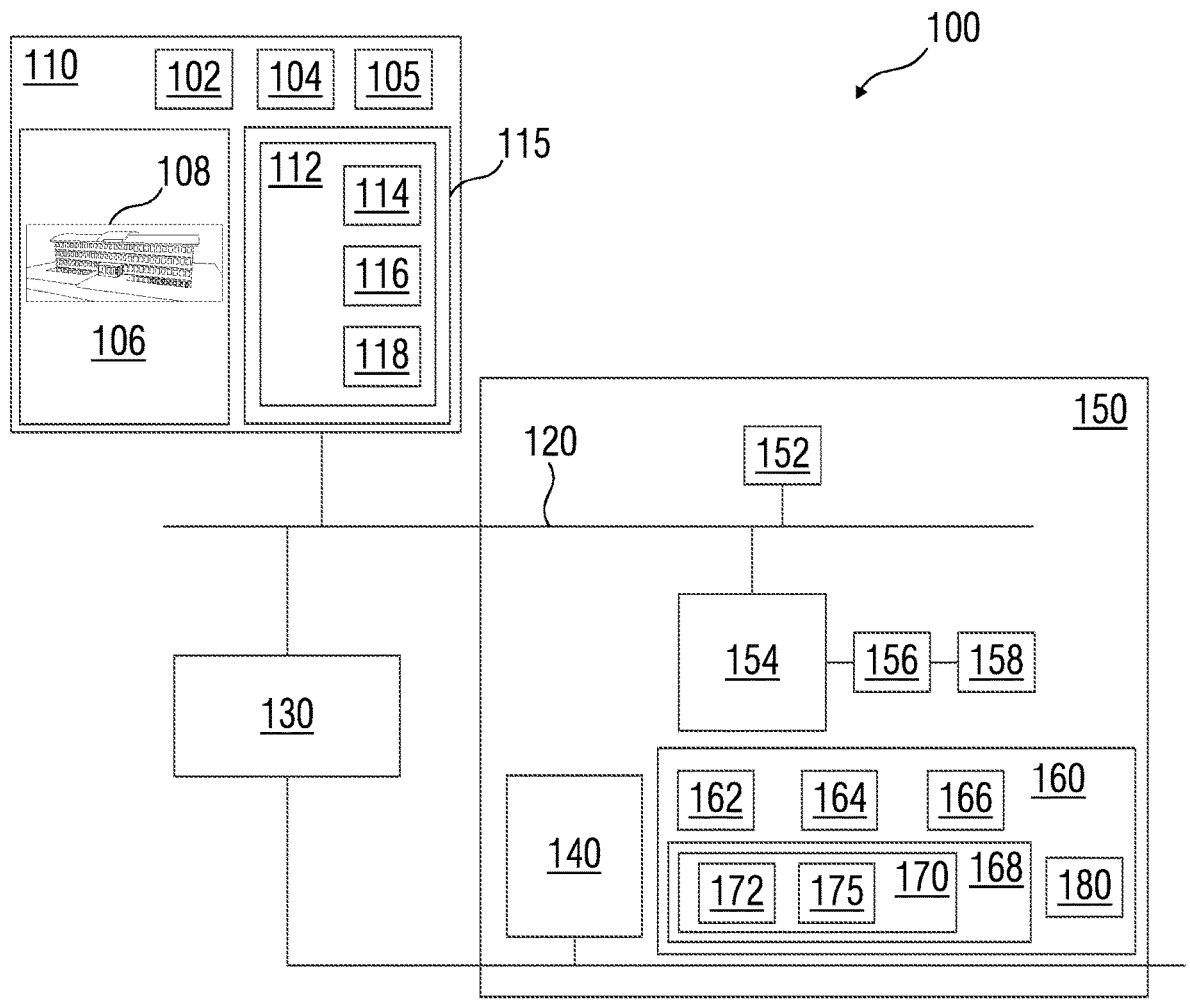
FIG. 1 illustrates a schematic representation of system and wearable device for managing a building automation environment, incorporating teachings of the present disclosure.

In some embodiments of the teaching herein, there is method of managing a building automation environment that comprises determining coordinates of a wearable device and associated wearer in the building automation environment; rendering a representative view of at least one portion of the building automation environment, based on the coordinates of the wearable device and an environment map associated with the building automation environment, wherein the representative view includes a multi-dimensional view of the at least one portion of the building automation environment and wherein the at least one portion includes one or more devices in the building automation environment; and modifying operation parameters of the at least one portion of the building automation environment through one of gesture-based and voice-based inputs.

Some embodiments include establishing a communication channel between the wearable device and the building automation environment via a building automation server operable on a cloud computing platform. The communication channel may be established via secured wireless communication channels. Further, the method may include receiving on the wearable device the environment map. The environmental map as used herein refers to a map including geometric coordinates of the devices from building model data. The building model data comprising a dataset pursuant to one or more Building Information Modelling Standards. Example Building Information Modelling Standards include United States National Building Information Modeling Standard, published Dec. 18, 2007 in Version 2, United States National Building Information Modeling Standard, published 2015 in Version 3, BIM Guideline for Germany, File Reference 10.08.17.7-12.08, published 2013, British Standard 8536-2:2016 and ÖNORM A 6241-2:2015.

Some embodiments include mapping relative coordinates of the wearable device to predetermined coordinates of the building automation environment. Further, the method may include validating the mapping of the relative coordinates of the wearable device based on a scannable input to the wearable device, wherein the scannable input is provided at a predetermined location in the building automation environment. For example, the scannable input may be a barcode or a QR code or an AR marker. Accordingly, the method ensures that the location of the wearable device is precisely mapped.

Some embodiments include determining the location of the wearer and the wearable device using a combination of computer vision algorithms. For example, techniques includes inside-out tracking and Simultaneous Localization and Mapping (SLAM). The computer vision algorithms advantageously determine the precise location of the wearable device.

Some embodiments include detecting the devices in the at least one portion of the building automation environment based on the environment map. The devices also include devices that are not directly visible to occupants/the wearer in the at least one portion of the building automation environment. Further, the method may include rendering a suggestive direction indicating the location of the devices. In some embodiments, a bounding box is superimposed at the location of the devices that are not visible. Accordingly, the teachings of the present disclosure address the problem of detecting devices that are not easily visible. For example, detecting devices such as valves or thermostats that may be obstructed by a wall. In some embodiments, the above methodology is referred to as an X-ray mode. Some embodiments include rendering the representative view of the at least one portion in an X-ray mode, whereby the operation parameters of components of the devices are rendered.

Some embodiments include determining a view vector for the devices with respect to the coordinates of the wearable device. As used herein "view vector" refers to the viewing trajectory of the wearable device. Some embodiments include mapping the coordinates of the wearable device to the geometric coordinates in the environment map associated with the devices.

Some embodiments include retrieving the operation parameters associated with the devices in the at least one portion of the building automation environment. Some embodiments include validating that the retrieved operation parameters are associated with the devices. Furthermore, some embodiments include rendering the representative view including the operation parameters of the devices in the at least one portion of the building automation environment.

Some embodiments include establishing the communication channel using building communication protocol between the devices in the building automation environment, wherein the building communication protocol include at least one of Building Automation and Control network (BACnet), Modbus, Local Operating Network (Lonwork) and Digital Addressable Lighting Interface (DALI) protocol.

In an example scenario the wearer needs to be directed to a predetermined portion of the building automation environment. Some embodiments include determining an optimal route from the coordinates of the wearable device to a predetermined portion of the building automation environment. Some embodiments include guiding the wearer to the predetermined portion of the building automation environment by rendering the suggestive directions indicating the optimal route. This is particularly relevant in cases of maintenance of one or more faulty devices. A service engineer using the wearable device is directed to the one or more devices.

Some embodiments include a wearable device for managing a building automation environment. The wearable device includes a processing unit and a memory unit coupled to the processing unit, wherein the memory unit comprises an augmented awareness-based management module configured for performing the method as disclosed above.

Some embodiments include a communication unit operable to communicate with a remote computer and; wherein the processing unit is coupled to the communication unit. The communication unit is also configured to communicate with devices in a building automation environment using associated protocols such as BACnet, Modbus, Lonwork and DALI protocol.

Some embodiments include a system for managing a building automation environment. The system comprising one or more processing units and one or more memory units coupled to the one or more processing units, wherein the one or more memory units comprises an augmented awareness-based management module configured for performing the method as indicated above.

Some embodiments include a system comprising one or more servers remotely located from a building automation environment. Further, the system comprises one or more sensors communicatively coupled to the one or more servers. Furthermore, the system comprises one or more wearable devices communicatively coupled to the one or more servers, wherein the one or more servers comprise computer readable instructions, which when executed by the one or more servers cause the one or more servers to perform the method as disclosed herein above.

The one or more wearable devices may be communicatively coupled to each other. The system may be implemented when multiple users are navigating in the building automation environment and need to communicate with each other.

Some embodiments include a computer program product comprising machine readable instructions, that when executed by a processing unit, cause the processing unit to perform a method as disclosed herein above.

The teachings of the present disclosure are not limited to a particular computer system platform, processing unit, operating system, or network. One or more aspects may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to any particular distributed architecture, network, or communication protocol.

The above-mentioned and other features of the teaching herein are addressed with reference to the accompanying drawings. The illustrated embodiments are intended to illustrate, but not to limit the scope of the disclosure. Various embodiments are described with reference to the drawings, wherein like reference numerals are used to refer to like elements throughout. In the following description, devices operating with the BACnet protocol have been considered as an example for the purpose of explanation. These examples must not be considered to limit the application of the teachings herein to a particular communication protocol used in a building automation environment. It may be evident that such embodiments may be practiced without these specific details. Further, numerous specific details are set forth in order to provide thorough understanding of one or more embodiments.

FIG. 1 illustrates a schematic representation of system 100 including a server 110 and a wearable device 160 for managing a building automation environment, incorporating teachings of the present disclosure. As shown in FIG. 1, a portion 150 the building automation environment (hereinafter referred as portion 150) is seen. The operation of the server 110 and the wearable device 160 is explained in relation to the portion 150. It can be appreciated by a person skilled in the art that the operation of the server 110 and the wearable device 160 can be extended to manage the entire building automation environment in a similar manner.

The portion 150 includes wireless router, sensors and actuators to enable access and control of the ambient environment. For example, in FIG. 1 the router 152 is a wireless router communicatively coupled to a room operating unit 140, a fire alarm panel 154, an emergency box 156 and a fire alarm 158. In an embodiment, the router 152 is a Building Automation and Control Network (BACnet) router. Accordingly, the room operating unit 140, the fire alarm panel 154, the emergency box 156 and the fire alarm 158 are configured to communicate using the BACnet communication protocol.

The server 110 and the wearable device 160 are illustrated in the system 100 having a client-server architecture. The client-server architecture 100 includes the server 110, the wearable device 160, and the portion 150. The wearable device 160 and the server 110 communicate with the portion 150 via a network 120, for example, local area network (LAN), wide area network (WAN), WiFi, etc. In one embodiment, the server 110 is deployed in a cloud computing environment. As used herein, "cloud computing environment" refers to a processing environment comprising configurable computing physical and logical resources, for example, networks, servers, storage, applications, services, etc., and data distributed over the internet. The cloud computing environment provides on-demand network access to a shared pool of the configurable computing physical and logical resources.

The server 110 may include a database 105 that comprises condition data obtained from one or more sensors deployed in the building automation environment. In particular to FIG. 1, the condition data from the sensors in the portion 150 is obtained. The server 110 further includes one or more processing units 102 and a memory 115 including an augmented awareness-based management module 112 that is configured to manage the building automation environment. The operation of the augmented awareness-based management module 112 is explained hereinafter.

The server 110 may include an interface 104 that receives data, for example, sensor data from one or more sensors and transfers the sensor data to the database 105. Additionally, the interface 104 may also communicate with the wearable device 160 and the portion 150 via the network 120.

The wearable device is used by an entity/wearer to access data associated with the portion 150 and to manage the building automation environment. The data on the server 110 can also be accessed by the entity via a graphical user interface 108 on a display 106 on the server 110. In some embodiments, the data can be accessed by the entity on another graphical user interface of an end user web application.

In addition to the wearable device 160, the server 110 communicates with a Building Automation (BA) station 130 to manage the portion 150. The BA station 130 may also be configured to operate as stand-alone or networked to perform complex control, monitoring, and without relying on the server 110. The BA station 130 communicates with the devices 140, 152-158 via the BACnet communication standard.

The wearable device 160 refers to a category of devices that can be worn by an entity and often include motion sensors, image capturing units and communication unit to transfer data to connected systems and devices. Example wearable devices include head mounted device, wrist devices, smart clothes, etc. The wearable devices are configured with a display unit 180 capable of providing the wearer an immersive augmented reality experience.

In FIG. 1, the wearable device 160 includes a processing unit 162, a communication unit 164, a sensing unit 166 and a memory 168. The processing unit 162 may execute instructions and/or modules stored in the memory 168. Accordingly, augmented awareness-based management module 170 is executed by the processor 162.

Operation of the augmented awareness-based management module 170 is similar to the augmented awareness-based management module 112 stored in the server 110. The sub-modules in the augmented awareness-based management modules 170 and 112 may differ based on the operation. Unless explicitly mentioned, it is considered that the same sub-modules are present in the augmented awareness-based management modules 112 and 170.

The augmented awareness-based management modules 112 and 170 may include the following sub-modules a map module, a location module and a Building Information Modelling (BIM) module. Typically, the map module 114 and the BIM module 118 may be provided on the server 110. Thereby, the existing mapping of the devices, building schema and the real-time parameters associated with the devices 140, 152-158 may be used by the wearable device 160 to superimpose the real-time parameters on the devices 140, 152-158.

The location module may be provided on both the server 110 and the wearable device 160. The location module 172 on the wearable device is configured perform real time inside-out tracking to determine co-ordinates of the wearable device and the wearer. For example, motion sensors in the sensing unit 166 is used to track the movement, displacement and direction of displacement of the wearable device 160. In another example, radio frequency sensors in the sensing unit 168 is used by the location module 172 to perform radio frequency triangulation/trilateration. In operation, the wearable device 160 initiates communication with the router 152 via the communication unit 164 using the BACnet communication standard. Strength of signal from the router 152 is used to determine the real-time location of the wearable device 160. In yet another example, satellite navigation unit in the sensing unit 164 is used to determine the location of the wearable device 160.

The location module 172 includes computer vision algorithms such as Simultaneous Localization and Mapping (SLAM). By executing the location module 172 current location of the wearable device 160 and the wearer may be determined. Further, the location is determined as co-ordinates with respect to the portion 150. In an embodiment, the location may be determined in relation to an initial location where the wearable device 160 is initiated. For example, the wearable device 160 may be initiated at a predetermined location using a scannable input. Accordingly, execution of the location module 172 results in self-localization of the wearable device 160. In turn, the wearable device 160 is configured to determine a navigation path within the portion 150 and even in the building automation environment.

The location module 116 on the server 110 is configured to access a BIM model to get the coordinates of the devices 140, 152-158 in the portion 150. In an embodiment, the location module 116 includes a navigation editor platform. The BIM model is imported into the navigation editor platform such that navigation mesh is built in real-time. The navigation mesh is used to calculate the navigation path from the co-ordinates of the wearable device 160 to any device in the building automation environment. Further, when the wearable device 160 is initialized the location module 116 configures the wearable device 160 as an entity in BIM model so that the coordinates of wearable device 160 are updated in the BIM model. Accordingly, as the wearer of the wearable device 160 moves inside building automation environment the BIM model is configured to track and provide real-time coordinates of the wearable device 160.

When the co-ordinates of the wearable device 160, the communication unit 164 is configured to receive an environmental map associated with the portion 150. The environment map including geometric coordinates of the devices 140, 152-158 from the BIM. The BIM includes building model data comprising a dataset pursuant to one or more Building Information Modelling Standards. Example Building Information Modelling Standards include United States National Building Information Modeling Standard, published Dec. 18, 2007 in Version 2, United States National Building Information Modeling Standard, published 2015 in Version 3, BIM Guideline for Germany, File Reference 10.08.17.7-12.08, published 2013, British Standard 8536-2: 2016, and ÖNORM A 6241-2:2015.

In some embodiments, the location module 172 is configured to determine a view vector for the devices 140, 152-158 with respect to the coordinates of the wearable device 160. The location module 172 may also be configured to map the coordinates of the wearable device 160 to the geometric coordinates in the environment map.

In some embodiments, the location module 172 may be configured detecting the devices 140, 152-158 in the portion 150 based on the environment map. The location module 172 may be further configured to detect the devices not directly visible to occupants/wearer in the portion 150. For example, the fire alarm panel 154 may be hidden by window blinds. The location module 172 is therefore configured to detect the fire alarm panel 154 even when hidden. Further, the display unit 180 is configured to render a suggestive direction indicating the location of the devices (visible and hidden).

The communication unit 164 is configured to retrieve the operation parameters associated with the devices 140, 152-158 in the portion 150. For example, the communication unit 164 may communicate directly with the server 110 via the network 120 or the BA station 130 via the BACnet communication standard. When the operation parameters are received, the processing unit 162 executes a validation module 175. The validation module 175 is configured to validate the retrieved operation parameters. Validation includes confirming that the operation parameters are associated with the devices. For example, the validation module includes a matrix of predetermined operation parameters versus the devices 140, 152-158. The matrix is used to validate the operation parameters that are received.

Figure 5:
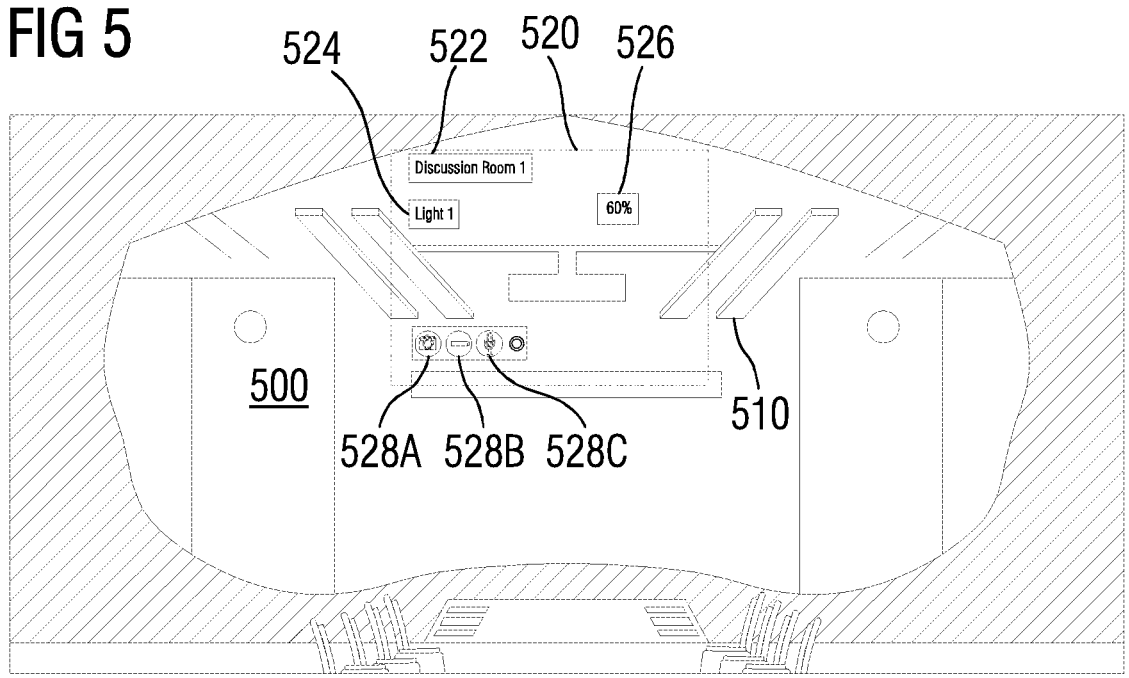
FIG. 5 illustrates a schematic representation of the head mounted display in FIG. 3 providing a representative view of a device in a building automation environment, incorporating teachings of the present disclosure.

The display unit 180 is configured to render a representative view of the portion 150, based on the coordinates of the wearable device and the environment map. The representative view includes a multi-dimensional view of the portion 150 including the validated operation parameters associated with the devices 140, 152-158 in the portion 150. FIG. 5 illustrates an exemplary representative view.

Further, the sensing unit 166 is configured to receive gesture-based or voice-based inputs from the wearer or any other authorised entity. The inputs are processed by the processing unit 162 to perform one or more actions/inactions. In an embodiment, the processing unit 162 is configured to modify operation parameters of one or more devices 140, 152-158. For example, varying the temperature of the portion 150 by modifying the temperature values in the room operating unit 140. In another example, the wearable device 160 is configured to turn off the fire alarm 158 that is accidently initiated by unintentional actuation of the emergency box 156.

It will be understood by a person skilled in the art that the modules explained hereinabove may be executed on various systems and devices such as the server 110, the BA station 130 and the wearable device 160. In operation, these system and devices are configured to manage the building automation environment by performing the method disclosed in FIG. 6.

Figure 2:
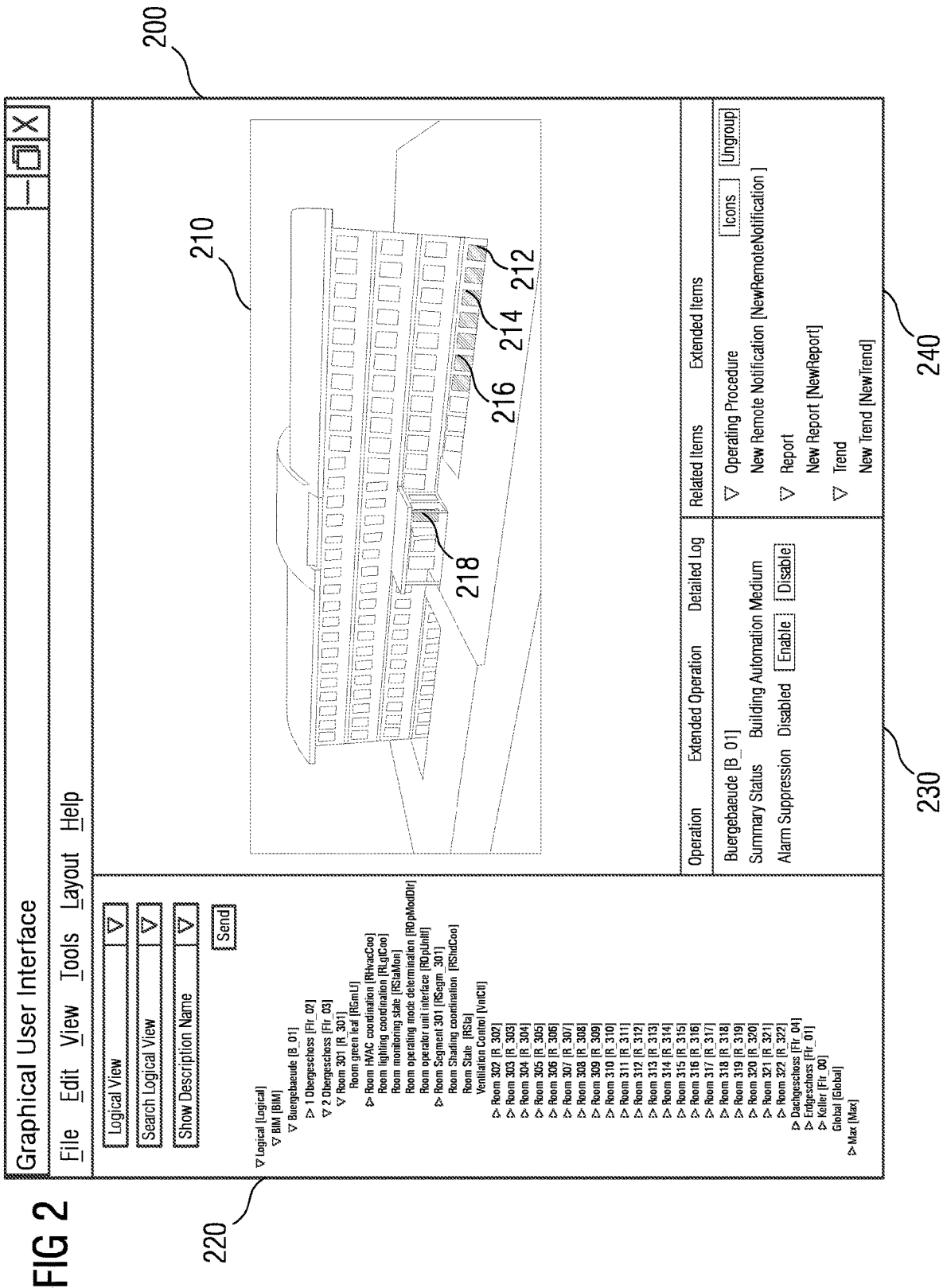
FIG. 2 illustrates a schematic representation a Building Information Model, incorporating teachings of the present disclosure.

FIG. 2 illustrates a schematic representation a Building Information Model (BIM) 200, incorporating teachings of the present disclosure. The BIM 200 is a digital representation of the building automation environment 210. The digital representation includes structural, logical, electrical schema of the building automation environment 210. The BIM 200 may include building model data that is used to generate the digital representation. When the wearable device 160 moves across rooms 212, 214, 216 and 218 the wearable device 160 is tracked. The BIM 200 is configured to selectively highlight the same in the digital representation.

The BIM 200 includes a building hierarchy 220 illustrated in a tree view. The building hierarchy indicates the structural, logical, electrical schema of how devices are installed in the building automation environment 210. Based on the location of the wearable device 160, details of the room is displayed in a location field 230. For example, if the device is in room 212, the location field 230 indicates the status of the room 212 and devices in the room 212. Further, details of the devices in the room 212 is provided in a parameter field 240. If the wearable device 160 is detects a fire alarm in room 212. The real-time operating parameter of the fire alarm are displayed in the parameter field 240. The parameter field may also display operating procedure and trend associated with the devices such as the fire alarm. The parameter field 240 is transmitted to the wearable device 160 to be rendered in the representative view.

Figure 3:
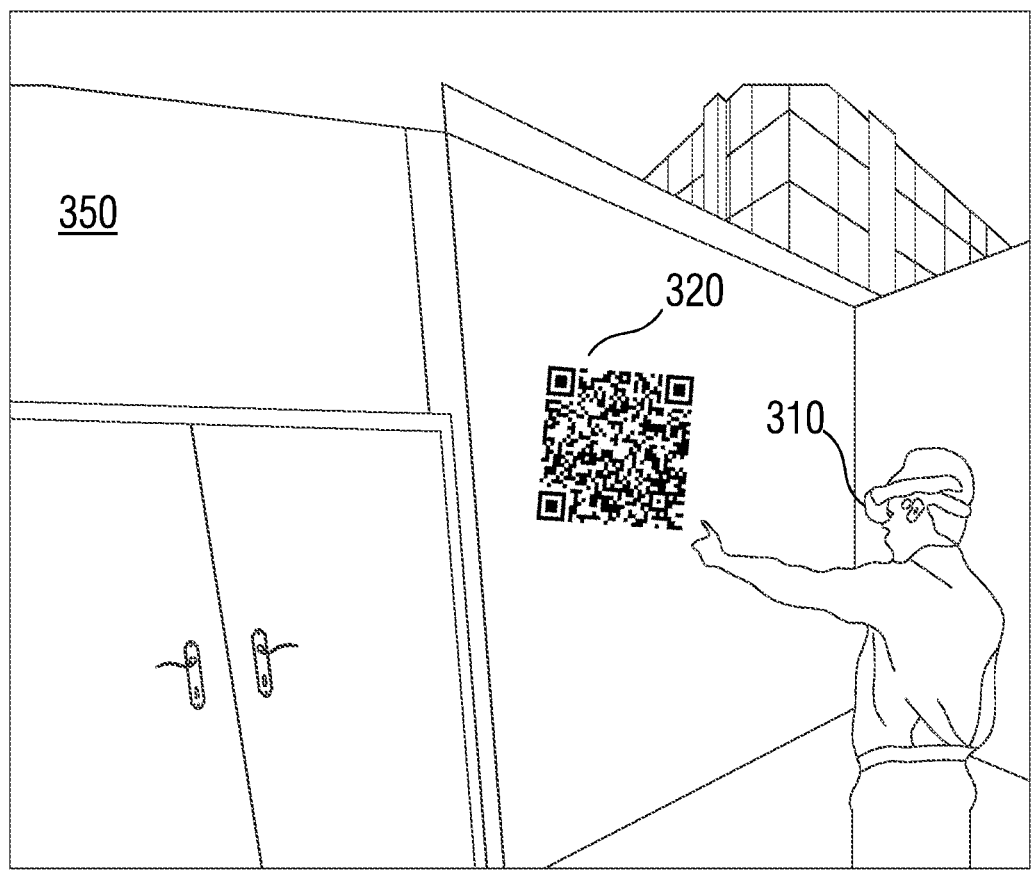
FIG. 3 illustrates a schematic representation determining coordinates of a head mounted display and associated wearer in a building automation environment, incorporating teachings of the present disclosure.

FIG. 3 illustrates a schematic representation determining coordinates of a head mounted display 310 and associated wearer in a building automation environment 350, incorporating teachings of the present disclosure. As shown in FIG. 3, a scannable input 320 is provided to the head mounted device 310. The scannable input 320 is may be the form of a barcode or a QR code or AR marker. The coordinates of the head mounted display 310 are determined by a location module on the head mounted display 310 by determining the coordinates from the QR code 320. The QR code 320 therefore enables the head mounted display 310 to establish a connection with a specific location in the building automation environment 350. The connection is used to determine the coordinates of the head mounted device 310 with respect to the building automation environment 350. The QR code 320 may be used in addition to tracking methodologies discussed in FIG. 1.

Figure 4:
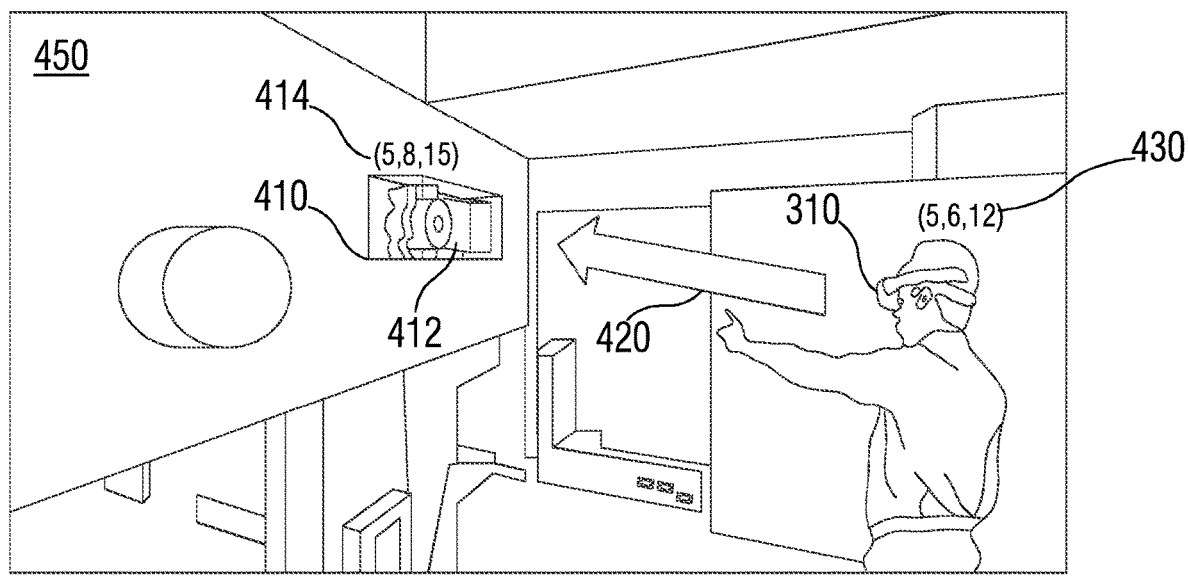
FIG. 4 illustrates a schematic representation mapping the coordinates of the head mounted display in FIG. 3 to the geometric coordinates in the environment map associated with at least one device, incorporating teachings of the present disclosure.

FIG. 4 illustrates a schematic representation mapping the coordinates of the head mounted display 310 to the geometric coordinates in the environment map associated with a device 412, incorporating teachings of the present disclosure. As shown in FIG. 4, the coordinates of the head mounted display 310 is 5, 6, 12 and the coordinates of the device 412 is 5, 8, 15. The coordinates are indicated by the numerals 430 and 414 for the head mounted display 310 and the device 412, respectively.

With the help of coordinates 430 & 414 the device 412 can be identified. During operation the wearer of the head mounted device 310 moves in the building automation environment 450. The wearer may initiate a gesture-based or voice-based input to the head mounted device 410. The gesture-based input may include limb-based movements or eye-based movement. The voice-based input may include voice or audio input. For example, the wearer gazes at the device 412, viewing trajectory of the wearer is used by the head mounted display 310 to check for a hit in an environmental map. As used herein, "a hit" refer to a condition when a view vector is determined for the device 412 and a bounding box 410 is rendered around the device 412. In addition, an arrow 420 may be rendered to point to the device 412. If the device 412 is not directly visible, the head mounted display identifies the device 412 using an X-ray mode. For example, the head mounted device 310 renders the bounding box 410 at a device location and thereby the wearer/occupant understands that there is a hidden device.

FIG. 5 illustrates a schematic representation of the head mounted display 310 providing a representative view 520 for a device 510 in a portion 500 of the building automation environment, incorporating teachings of the present disclosure. As shown in FIG. 5, the device 510 is an Internet of Things (IoT) light configured to communicate with the head mounted display 310 using the BACnet communication standard.

The head mounted display 310 is configured to render the representative view 520. The representative view 520 includes room identifier 522, light identifier 524 and light parameters 526. For example, the room identifier is Discussion Room 1, light identifier is Light 1, light parameters include the intensity level of 60%. Further, the representative view includes interactive icons 528A-528C. The interactive icons 528A-528C enable the IoT light 510 to perform certain operations. For example, by interacting with a microphone icon 528C the IoT light 510 indicates its energy consumption via a microphone communicatively coupled to the IoT light 510 and the head mounted display 310. In another example, interacting with an intensity icon will cause increase/decrease of the intensity level of the IoT light.

Apart from the above, the following additional information may be shown in the representation view 520. Alarm and fault status, service-related information such as run-time hours, service interval, data sheet etc. Further, in case service activity or operation may be difficult, the wearer could choose to watch a training video by interacting with a camera icon 528A.

The head mounted display 310 can be accessed from a remote location as it may be communicatively coupled with a remote server operable on a cloud computing platform. Accordingly, a service technician would be able to remotely access the representative view 520 as seen via the head mounted display 310. Step by step assistance may be provided via the microphone communicatively coupled to the head mounted display 310.

Figure 6:
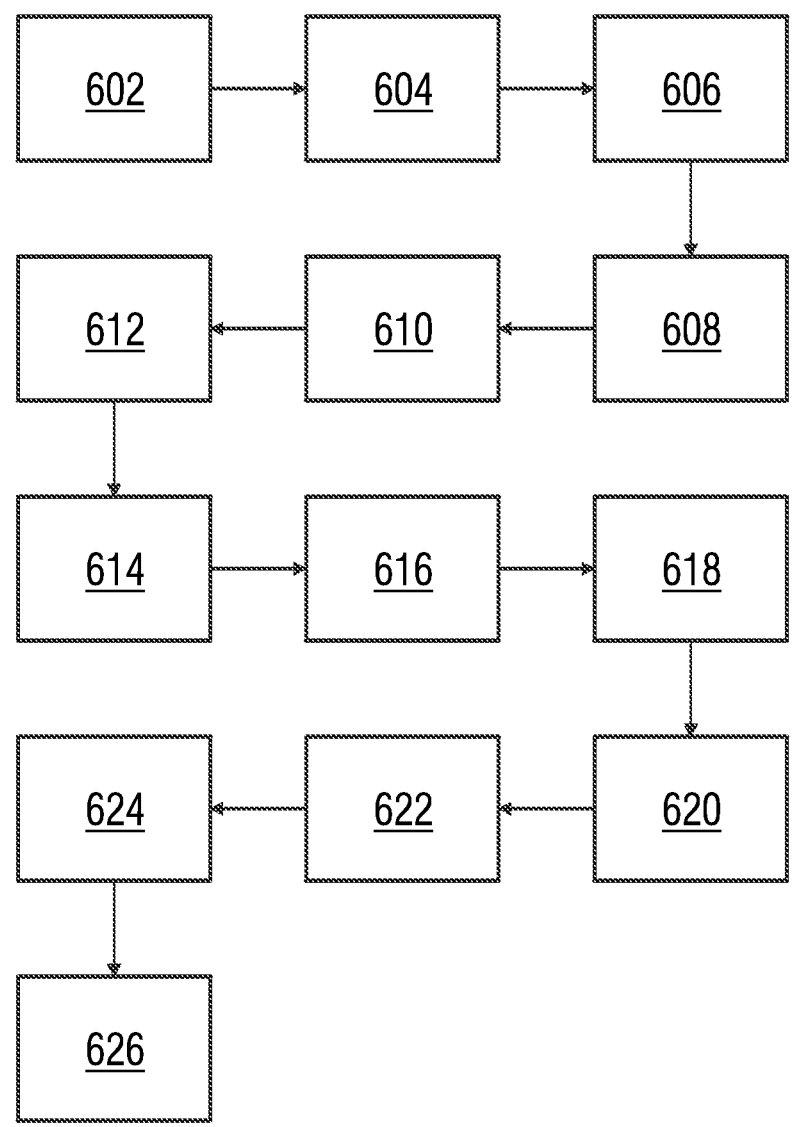
FIG. 6 is a flowchart illustrating a method for managing a building automation environment, incorporating teachings of the present disclosure.

FIG. 6 is a flowchart illustrating a method 600 for managing a building automation environment, incorporating teachings of the present disclosure. The method 600 includes at step 602 determining coordinates of a wearable device and associated wearer in the building automation environment. The coordinates of the wearable device may be determined by a combination of techniques such as radio frequency triangulation, computer vision algorithms, motion sensing, satellite navigation and scanning fixed scannable input. In some embodiments, a combination of computer vision algorithms, such as Simultaneous Localization and Mapping, and scanning of QR code is performed to determine the location of the wearable device.

At step 604, a communication channel is established between the wearable device and the building automation environment. In some embodiments, the communication channel is established via a building automation server operable on a cloud computing platform. In some embodiments, the communication channel using building communication protocol between the wearable device and devices in the building automation environment. The building communication protocol include at least one of Building Automation and Control network (BACnet), Modbus, Local Operating Network (Lonwork) and Digital Addressable Lighting Interface (DALI) protocol.

At step 606 an environmental map including geometric coordinates of the devices in the building automation environment is generated. The environmental map may be generated by a remote server from building model data. The building model data comprises a dataset pursuant to one or more Building Information Modelling Standards. It will be appreciated by a person skilled in the art that the environmental map may be generated before step 602 or in parallel to any of the preceding steps. At step 608 the environment map received on the wearable device.

At step 610 relative coordinates of the wearable device are mapped to predetermined coordinates of the building automation environment. At step 612, the mapping of the relative coordinates of the wearable device is validated based on the scannable input to the wearable device. The scannable input is provided at a predetermined location in the building automation environment to validate the relative coordinates.

At step 614, the devices in the one or more portions of the building automation environment are detected. A portion of interest to the wearer is determined based on a viewing trajectory of the wearable device. The step 614 also includes determining a view vector for the devices with respect to the coordinates of the wearable device. The view vector is derived based on the viewing trajectory of the wearable device. For example, the view vector may be represented by a bounding box around the devices. Accordingly, step 614 includes mapping coordinates of the wearable device and the devices in one or more portions of the building automation environment The devices are detected based on the environment map. The coordinates of the wearable device are mapped to the geometric coordinates in the environment map associated with the devices. The environmental map enables occupants or the wearer to detect the devices that are not directly visible. Further, at step 616 a suggestive direction is rendered by the wearable device indicating the location of the devices in the one or more portions.

At 618, the operation parameters associated with the devices in the at least one portion of the building automation environment are retrieved. Further, the retrieved operation parameters are associated with the devices are validated based on a matrix of the devices and predetermined operating parameters.

At step 620, a representative view of at least one portion of the building automation environment is rendered. The representative view includes a multi-dimensional view of the devices and the associated operating parameters. For devices that are not directly visible, the representative view is rendered in an X-ray mode.

At step 622, the operation parameters of the devices are modified through gesture-based or voice-based inputs.

In some embodiments, the wearable device is to be navigated to a predetermined device. In such an embodiment, the method 600 includes, at step 624, determining an optimal route from the coordinates of the wearable device to the predetermined devices of the building automation environment. At step 626, the wearer is guided to the predetermined device of the building automation environment by rendering the suggestive directions indicating the optimal route.

Some embodiments include a computer program product comprising program modules accessible from computer-usable or computer-readable medium storing program code for use by or in connection with one or more computers, processors, or instruction execution system. For the purpose of this description, a computer-usable or computer-readable medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology can be centralized or distributed (or a combination thereof) as known to those skilled in the art.

The invention claimed is:

1. A method of managing a building automation environment, the method comprising:
    determining coordinates of a wearable device and an associated wearer in the building automation environment;
    rendering a representative view of a portion of the building automation environment based on the determined coordinates and an environment map associated with the building automation environment, wherein the representative view includes a multi-dimensional view of the portion of the building automation environment and wherein the portion includes one or more devices in the building automation environment;
    wherein determining coordinates of the wearable device and associated wearer in the building automation environment further includes mapping relative coordinates of the wearable device to predetermined coordinates of the building automation environment, and validating the mapped coordinates based on a scannable input to the wearable device, wherein the scannable input is provided at a predetermined location in the building automation environment; and
    wherein the environment map includes geometric coordinates of the devices from building model data comprising a dataset conforming to one or more Building Information Modelling Standards;
    modifying operation parameters of the portion of the building automation environment through one of gesture-based and voice-based input from the wearable device to the one or more devices using the communication channel;
    detecting the devices in the portion of the building automation environment based on the environment map, wherein the devices include a set of devices not directly visible to occupants of the portion of the building automation environment;
    determining an optimal route from the coordinates to a further predetermined portion of the building automation environment; and
    guiding the wearer to the further predetermined portion by rendering directions indicating the optimal route.

2. The method according to claim 1, further comprising:
    establishing a communication channel between the wearable device and the building automation environment via a building automation server operating on a cloud computing platform; and
    delivering the environment map to the wearable device.

3. The method according to claim 1, further comprising:
    determining a view vector for the devices with respect to the coordinates of the wearable device; and
    mapping the coordinates of the wearable device to the geometric coordinates in the environment map associated with the devices.

4. The method according to claim 1, wherein rendering a representative view of the portion of the building automation environment comprises:
    retrieving the operation parameters associated with the devices in the portion of the building automation environment;
    validating that the retrieved operation parameters are associated with the devices; and
    rendering the representative view including the operation parameters of the devices in the portion of the building automation environment.

5. The method according to claim 1, further comprising rendering the representative view of the at least one portion in an X-ray mode, whereby the operation parameters of components of the devices are rendered.

6. A wearable device for managing a building automation environment, the device comprising:
    a processing unit; and
    a memory unit coupled to the processing unit, the memory unit comprising an augmented awareness-based management module configured for performing a method of managing a building automation environment, the method comprising:
    determining coordinates of a wearable device and an associated wearer in the building automation environment;
    rendering a representative view of a portion of the building automation environment based on the determined coordinates and an environment map associated with the building automation environment, wherein the representative view includes a multi-dimensional view of the portion of the building automation environment and wherein the portion includes one or more devices in the building automation environment;
    wherein determining coordinates of the wearable device in the building automation environment further includes mapping relative coordinates of the wearable device to predetermined coordinates of the building automation environment, and validating the mapped coordinates based on a scannable input to the wearable device, wherein the scannable input is provided at a predetermined location in the building automation environment; and
    wherein the environment map includes geometric coordinates of the devices from building model data comprising a dataset conforming to one or more Building Information Modelling Standards;
    modifying operation parameters of the portion of the building automation environment through one of gesture-based and voice-based input captured by the wearable device and transmitted to the one or more devices using the communication channel;
    detecting the devices in the portion of the building automation environment based on the environment map, wherein the devices include a set of devices not directly visible to occupants of the portion of the building automation environment;
    determining an optimal route from the coordinates to a further predetermined portion of the building automation environment; and
    guiding the wearer to the further predetermined portion by rendering directions indicating the optimal route.

7. The wearable device according to claim 6, further comprising a communication unit operable to communicate with a remote server, wherein the processing unit is coupled to the communication unit.

8. A system comprising:
one or more servers located remote from a building automation environment;
one or more sensors communicatively coupled to the one or more servers; and
one or more wearable devices communicatively coupled to the one or more servers;
wherein the one or more servers comprise computer readable instructions, which when executed by the one or more servers cause the one or more servers to perform a method of managing a building automation environment, the method comprising:
determining coordinates of a wearable device and an associated wearer in the building automation environment;
rendering a representative view of a portion of the building automation environment based on the determined coordinates and an environment map associated with the building automation environment, wherein the representative view includes a multi-dimensional view of the portion of the building automation environment and wherein the portion includes one or more devices in the building automation environment;
wherein determining coordinates of the wearable device and associated wearer in the building automation environment further includes mapping relative coordinates of the wearable device to predetermined coordinates of the building automation environment, and validating the mapped coordinates based on a scannable input to the wearable device, wherein the scannable input is provided at a predetermined location in the building automation environment; and
wherein the environment map includes geometric coordinates of the devices from building model data comprising a dataset conforming to one or more Building Information Modelling Standards;
modifying operation parameters of the portion of the building automation environment through one of gesture-based and voice-based input captured by the wearable device and transmitted to the one or more devices using the communication channel;
detecting the devices in the portion of the building automation environment based on the environment map, wherein the devices include a set of devices not directly visible to occupants of the portion of the building automation environment;
determining an optimal route from the coordinates to a further predetermined portion of the building automation environment; and
guiding the wearer to the further predetermined portion by rendering directions indicating the optimal route.

9. The system according to claim 8, wherein the one or more wearable devices are communicatively coupled to each other.

* * * * *